Figure 1:
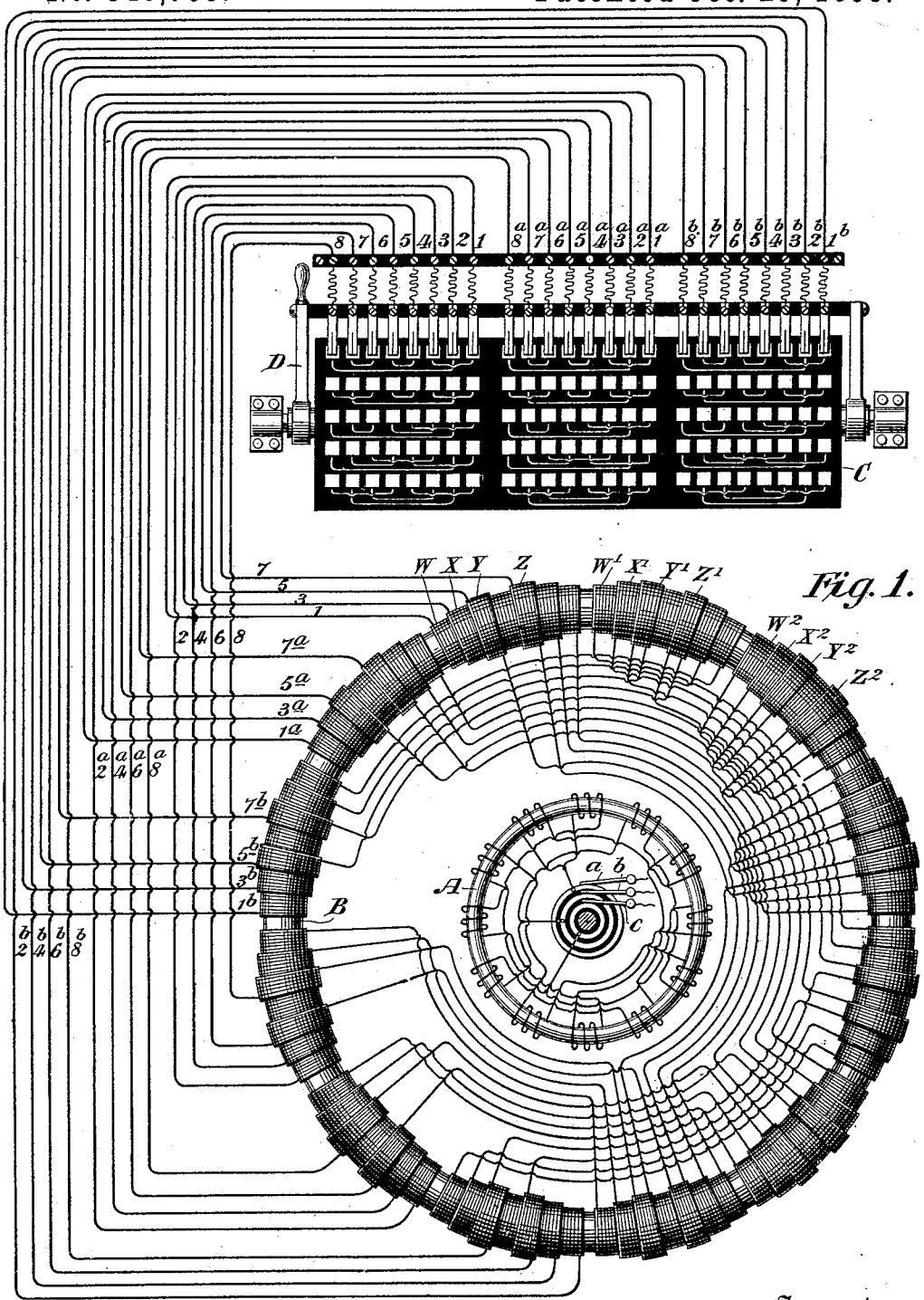

(No Model.) 2 Sheets—Sheet 2.

F. S. HUNTING.
POLYPHASE ALTERNATING CURRENT MOTOR.

No. 548,709. Patented Oct. 29, 1895.

Witnesses
C. E. Ashley
Henry W. Lloyd.

Inventor
Fred S. Hunting
By his Attorneys

UNITED STATES PATENT OFFICE.

FRED S. HUNTING, OF FORT WAYNE, INDIANA.

POLYPHASE ALTERNATING-CURRENT MOTOR.

SPECIFICATION forming part of Letters Patent No. 548,709, dated October 29, 1895.

Application filed March 14, 1893. Serial No. 465,874. (No model.)

*To all whom it may concern:*

Be it known that I, FRED S. HUNTING, a citizen of the United States, residing at Fort Wayne, in the county of Allen and State of Indiana, have invented certain new and useful Improvements in Polyphase Alternating-Current Motors; and I do hereby declare the following to be a full, clear, and exact description of the invention, such as will enable others skilled in the art to which it appertains to make and use the same.

This invention relates to alternating-current induction-motors, the object being to obviate the use of an external resistance ordinarily employed in such motors.

The invention relates particularly to that kind of motors in which a rotary magnetic field is developed by the conjoint action of a plurality of differential-phase alternating currents and the polarizing-current is developed in the armature-circuit by the induction due to slip between the armature and the poles constituted by the rotary magnetic field.

Under the ordinary practice in this art it is necessary in order to get a strong torque at starting and at very low speeds to insert resistance in the secondary or induced circuit, so as not to allow more than a given amount of current to flow in said circuit until the element upon which it is wound acquires such a speed that the percentage of slip between it and the rotary field is comparatively small. If no such resistance is inserted, the strong induction produces a current strength in the armature which weakens by reaction and forces the lines of force to leap through the air externally to the secondary circuit rather than pass through the latter. Under these circumstances the degree of attraction between the poles of the rotary field and the secondary poles in the armature is comparatively small and the torque weak.

By means of my invention I am enabled to organize the secondary circuit in such a way that the number of its effective turns may be varied within considerable limits and the strength of the induced poles therefore regulated so as to give the best co-operative result and develop the maximum torque at different rates of speed of the motor. I accomplish this result by forming of the induced circuit a number of sections which may be coupled in various ways to produce a substantially uniform degree of secondary magnetization at different speeds. Ordinarily this is accomplished by using a variable resistance external to the motor and connected in the secondary circuit, by adjusting which the amount of current flowing through the secondary circuit is regulated so as to produce a substantially uniform polarizing effect upon the secondary element at all speeds.

I carry out my invention by providing the secondary element with several windings, the terminals of which may be carried to a switch and by the adjustment of this switch may be coupled in different relations, so that they all act together or some are thrown into opposition to others and in this way, although the resistance of the circuit may be a constant factor, the polarization may be graduated to a degree most effective at any given speed.

A single secondary circuit may be used and opposing electromotive forces be set up within different parts of the same. In all cases the coils are so placed that if a single secondary circuit is employed they will all be in the same phase with relation to the core, and if a polyphase secondary circuit is employed the several coils of each branch of the polyphase winding will be in the same phase relation to the core; but I prefer to use a plurality of secondary circuits in which currents of different phase will be generated, these circuits maintaining the induced poles of substantially uniform strength at a definite speed.

My invention therefore comprises an alternating-current induction-motor the secondary winding of which is provided with means for coupling its convolutions, so that the number of effective turns contributing to the polarization of the secondary element may be varied, the parts of the secondary winding being so related to the core that co-operating coils will be in the same phase relation to the core.

The invention involves other features, which will be more particularly described, and definitely indicated in the claims appended to this specification.

Figure 2:
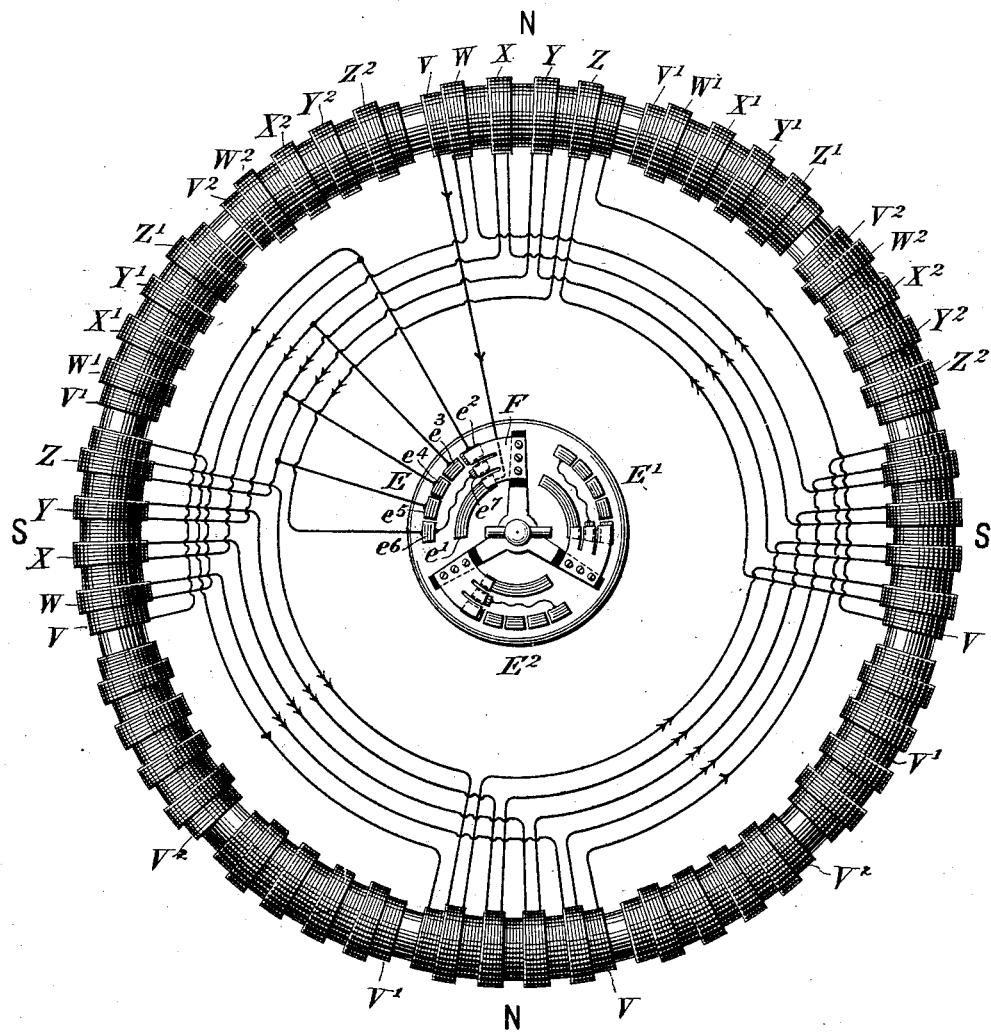

In the accompanying drawings, which illustrate the invention, Figure 1 is a diagram of a four-pole motor constructed in accordance with my invention, and Fig. 2 is a diagram of a secondary element provided with an alternative form of coupling-switch.

I have shown the motor as organized for operation with a triphase alternating-current circuit, although, of course, it will be understood that the invention is general in character and will be applicable to an alternating circuit of any order. I have also shown a four-pole motor, though it will be understood that the invention is applicable to a bipolar motor or motor having any number of poles.

At A is shown the primary element, which in this case is the rotary element, the windings of which are connected through three brushes $a$ $b$ $c$ with a triphase alternating-current circuit. When current is circulating in such a circuit, the three currents, differing in phase by one hundred and twenty degrees, are led into the primary winding and develop therein a rotary magnetic field. In the style of winding shown this field will be four-pole in character. Many methods of winding for accomplishing this are now well understood in the art, and it will be unnecessary to follow the circuit in detail. The one shown is simply a closed coil tapped at three equidistant points and connected with three insulated contact-rings, upon which bear the brushes $a$ $b$ $c$. Such a motor tends to attain a speed in which the time of transit of the rotary element over the arc subtended by two adjacent poles is synchronous with half a wave period—that is to say, in a four-pole motor it would tend to make a complete revolution during the passage of two current-waves; but when the motor is loaded or when starting from rest the rotary element has a much lower speed and there is a certain amount of slip, depending upon the amount of load, between the primary and induced poles, and as the degree of induction in the secondary increases as the slip increases the secondary element is much more strongly polarized when the motor is starting than when it is operating at a high speed. It is therefore desirable to provide means by which the stronger induced current developed by this increased amount of induction may be lowered in magnetizing effect upon the secondary element.

In the motor illustrated in the drawings I have shown the secondary element B provided with three independent circuits, each having four sections or groups of coils wound upon the ring-core or magnetic circuit of the secondary element in such a way as to develop the number of poles required for the operation of the motor. In the form illustrated, where four poles are required, each section comprises four coils, successive coils being reversely connected. Eight terminals are thus provided for the four groups of coils in each of these circuits, making twenty-four terminals in all, and these terminals are connected by wires 1 2 3 4 5 6 7 8, $1^a$ $2^a$ $3^a$ $4^a$ $5^a$ $6^a$ $7^a$ $8^a$, and $1^b$ $2^b$ $3^b$ $4^b$ $5^b$ $6^b$ $7^b$ $8^b$ to a switch C, the function of which is to couple the several groups of coils in different ways. For example, one section may have eight convolutions in each coil, another section two convolutions in each coil, a third section one convolution in each coil, a fourth group one convolution in each section, and by coupling the terminals in different ways we may attain a result in which all the convolutions act together, thus giving a resultant effect on each pole for each circuit of eight plus two plus one plus one, or twelve effective turns; or we may have eight opposed by the other four, or we may have eight assisted by two and opposed by two, or we may have eight assisted by one and opposed by three, or we may have eight assisted by three and opposed by one, thus making five combinations in which the coils may be grouped, each combination having a different resultant magnetizing effect upon the secondary element when the slip is constant or producing an approximately constant magnetizing effect when the slip is variable. Moreover, the several coils in each section are so spaced that they are in the same phase relation to the core, thus causing the induced electromotive force to combine in the most effective manner to magnetize the secondary element. The switch by which this is accomplished may be of any suitable construction. The form shown comprises a fixed cylinder provided with five rows of as many contacts as there are terminals to be connected, the contacts being coupled together in such a way as to put the smaller sections in series with or in opposition to the coils of the large section or part in series and part in opposition.

Co-operating with the cylinder upon which the contacts are mounted is a switch-arm D, controlled by a handle, capable of circumferential adjustment upon the cylinder, and mounted upon the switch-arm are eight brushes for each of the three circuits, connected by flexible connections with the corresponding terminals. Let us assume that the switch-arm D is shifted so that its brushes bear upon the first row of contacts. We then have the three secondary circuits closed, and starting from terminal 1 of the larger section we pass from its connecting-brush into contact 1, which connects by a fixed wire with contact 3. Thence we pass by wire 3 through the section marked X, around the secondary element in a right-handed direction, out by wire 4 into brush 4 thence by a fixed connection to contact 5, and by wire 5 to the section marked Y, and around the ring in a right-handed direction, thence by wire 6 to contact 6, and by the fixed connection to contact 7, and by wire 7 to the section marked Z, and around the ring in a right-handed direction, thence back by wire 8 to contact 8, thence by the fixed-wire connection to contact 2, and by wire 2 to the large section, and around the ring in a left-handed direction to contact 1, which completes the circuit at the point from which we started. We thus have a completely-closed circuit with all the convolutions upon the secondary element electrically connected; but it will be noticed that whereas the sections of two, one, and one are connected right-handedly, the section of eight is connected left-handedly. We thus have a combination in which the secondary electromotive forces developed in the three smaller sections are in opposition to the electromotive force developed in the larger section.

By following the connections from contacts $1^a$ $2^a$ $3^a$ $4^a$ $5^a$ $6^a$ $7^a$ $8^a$ and $1^b$ $2^b$ $3^b$ $4^b$ $5^b$, &c., it will be seen that the current will flow similarly in these circuits; but as the coil groups $W'$ $X'$ $Y'$ $Z'$ and $W^2$ $X^2$ $Y^2$ $Z^2$ are displaced one-third the distance between the successive north and south poles of the motor the currents in these circuits will be displaced one-third of a phase, or one hundred and twenty degrees, from one another, and will therefore react upon the secondary core to maintain a comparatively constant pole strength in a manner well understood by those familiar with polyphase motors.

Of course it will be understood that the system is not limited in application to a three-phase circuit on the secondary element, but might contain any number. If a single circuit were used on the secondary element, the pole strength would fluctuate considerably because only a simple alternating current would be active in polarizing said element, so that a plurality of circuits is to be preferred, but in all cases the coils forming a branch, if the winding be a polyphase winding; or if the winding be a single phase winding then all the coils must be in the same phase relation to the core. For example, in the drawings it will be seen that all the coils of any one section, as W, X, Y, or Z, are so placed upon the core that their induced electromotive forces will be in exactly the same phase. The four coils of the section W are so spaced upon the ring that their relations to the north and south poles of the rotary field will simultaneously develop in them a maximum or minimum electromotive force. Moreover, the several subcoils of the sections W, X, Y, and Z are superimposed upon each other, so as to be in exactly the same phase relation. It will be seen also that the other coil systems of the polyphase winding $W'$ $X'$ $Y'$ $Z'$ $W^2$ $X^2$ $Y^2$ $Z^2$ are arranged in the same manner, so that all the induced electromotive forces in the coils in any one circuit are coordinate in phase, and therefore add together with a maximum effect in developing secondary current. If such coils were not in the same phase relation, a resultant electromotive force would be developed which would be less in value than the sum of all the electromotive forces. By shifting the brushes to the second row of contacts we will have the X group connected in opposition, the Y group connected in opposition, and the Z group connected in series or in conjunctive relation to the main or W group of coils. In the third row of contacts we will have the X group in conjunction and the Y and Z groups in opposition with the large group of coils. When the brushes are shifted to the fourth row of contacts, we will have the X and Y groups operating in conjunction with and the Z group in opposition to the larger group of coils. In the fifth combination we will have all of the coil-sections in the secondary operating in conjunction. It will thus be seen that by providing the secondary circuit with sections of a different number of turns we may couple those sections, so that the secondary electromotive forces developed will act in conjunction to or in opposition to one another and develop any desired magnetizing effect upon the secondary magnetic circuit. In starting the motor from a state of rest, for example, the brushes will be shifted to a point where the large section will be opposed by all the others, thus giving a minimum number of effective turns, as should be the case, by reason of the much greater strength of the induced electromotive force when the motor is started. As the motor rises in speed the coils may be grouped in the various ways so as to attain the best result; or when the motor is operating under load, if the induction become too great, so as to weaken the torque, the switch may be shifted upon a group of contacts which will develop the maximum torque.

In Fig. 2 is shown a secondary element in which no external wiring is needed, the several terminals of the coil-sections being carried to groups of contacts mounted concentric with the motor-shaft. The primary element is not shown in this diagram to avoid complication. As shown, the secondary magnetic circuit is provided with three separate electric circuits, as in Fig. 1. The switch connections for only one of these circuits are shown, however, to avoid confusion in the drawing. It will be understood, however, that the connection for the other two circuits will be precisely similar. The element shown in Fig. 2 is wound to develop four poles also. Four sets of coils ninety degrees apart are interconnected in a way to develop alternately north and south polarities. In this case, as in the case illustrated in Fig. 1, I prefer to place the several coils V W X Y Z, which contribute to the development of one pole, in the same inductive or phase relation to the magnetic core, and this may be done, as shown, by superposing the windings. Each of the three circuits will be connected with contacts mounted within the secondary element, over which sweeps a brush to change the connections, so as to render the polarizing effect upon the secondary element greater or less, as may be desired. For example, the switch may be provided with three groups of contacts E E' E², with which a three-arm switch F, carrying insulated brushes, co-operates. The brushes will be so set that the connections for the three circuits with which the ring is wound will be similar in any position of adjustment.

Each group of contacts is composed of one long contact connected with one terminal of one of the circuits and a group of shorter contacts connected at intermediate points of the circuit, so that as the brush is shifted over the long contact more or less of the circuit may be thrown into or cut out of action. For example, each circuit is made up of four sets of superposed coils similar to V W X Y Z. The larger coils (marked V) are connected together in a suitable manner to develop poles at four points of the ring, and the smaller coils W X Y Z are similarly connected together and to the system marked V in such a way that they will, when all are active, oppose the electromotive force set up in the system V, and intermediate connections are carried to the contacts $e^2$ $e^3$ $e^4$ $e^5$ $e^6$, so that when the switch F is shifted from $e^6$ toward $e^2$ the coils Z Y X W will be successively cut out of circuit and their opposition to the electromotive force developed in V withdrawn. Contact $e^7$ is placed between the contacts $e^2$ and $e'$, so that when the brush is in the position indicated in the drawings contacts $e'$ $e^2$ $e^7$ will all be bridged, and the contact $e^7$ is electrically connected with contact $e^6$.

From this construction it will be understood that if the brush bears upon the contact $e^6$ the electromotive force of the large group of coils V will be opposed by the electromotive forces of all of the groups of coils W X Y Z. Let us assume that the rotary field induced in the primary element is in a position indicated by the polarity-marks N S N S and that the electromotive force is induced in the coil system V, so as to exert a pressure on the circuit in the direction indicated by the single arrow. Following this circuit we will find that when we reach the point where it connects with the coil system W it meets an opposing electromotive force, as indicated by the double arrow, because of a reverse system of connection, as indicated, to which electromotive force all of the coils W X Y Z contribute. Now, by reason of the connections leading to the several contacts $e^2$ $e^3$ $e^4$ $e^5$ $e^6$, as indicated, as the switch is shifted from $e^6$ toward $e^2$ the coil-sections Z Y X W will be successively cut out and their electromotive force withdrawn from opposition to the electromotive force of the coils V. Thus, assuming that each coil V has eight turns and that each of the coils W X Y Z has one turn, we will have when the brush bears upon the contact $e^6$ in each group eight minus four, or four effective turns, when the brush bears upon $e^5$ we will have eight minus three, or five effective turns, when the brush bears upon $e^4$ we will have eight minus two, or six effective turns, when the brush bears upon $e^3$ we will have eight minus one, or seven effective turns, and when the brush bears upon $e^2$ we will have eight minus naught, or eight effective turns, thus permitting of a gradual variation of the degree of polarization. The contact $e^7$ placed between $e^2$ and $e'$ is connected with contact $e^6$, as before stated, so that when the brush bridges the three contacts we will have two circuits in multiple arc, one of which takes in the coil system V and another of which takes in the coil system W X Y Z in series and in conjunctive relation to the coil system V, thus rendering all of the turns upon the secondary element effective in contributing to its polarization. It will of course be understood from what is hereinbefore described that the arrangement of the switches might be made in various ways so as to effect the desired degree of graduation in the magnetic strength of the poles in the secondary element, the two examples cited being by way of illustration. The co-operation of the several circuits V W X Y Z, V' W' X' Y' Z', and V² W² X² Y² Z² to prevent the fluctuation in pole strength at any given speed of rotation is, of course, the same as for the system described in connection with Fig. 1 and is an incident of the system of winding by which currents of differential phase will be developed in these three circuits.

Some of the improvements herein described are applicable to induction-motors in general irrespective of the number of currents employed to operate them, such motors involving an alternating magnetic field and a secondary element inductively related thereto.

Having thus described my invention, what I claim as new, and desire to secure by Letters Patent, is—

1. An alternating current induction motor having a primary winding and a polyphase secondary winding, the coils for each branch of the latter being sectional and distributed on the core so that the secondary electro-motive-forces in the several sections of a branch will be in the same phase.

2. An alternating current motor having the primary element wound to develop a rotary magnetic field, a sectional secondary winding, the several sections being wound upon a ring or drum core so that the induced electro-motive-forces will be in the same phase in the several connected sections, and a switch for varying the number of effective turns.

3. An alternating current motor having the primary element wound to develop a rotary magnetic field, a sectional winding on the secondary element, the several sections being placed in the same phase relation to a ring or drum core, and means for coupling the several sections to act in conjunction or opposition in polarizing the secondary element.

4. An alternating current motor having its primary element wound to develop a rotary magnetic field, a sectional winding on the secondary element, each section being composed of a plurality of coils differing in magnetizing power but placed in the same phase relation to the several poles of a ring or drum core, and a switch for coupling the several sections to vary the magnetizing power of the winding.

In testimony whereof I affix my signature in presence of two witnesses.

FRED S. HUNTING.

Witnesses:
ALVA L. SEARLES,
ARTHUR L. HADLEY.